United States Patent
Bartfai-Walcott et al.

(10) Patent No.: US 10,120,727 B2
(45) Date of Patent: Nov. 6, 2018

(54) TECHNIQUES TO ALLOCATE CONFIGURABLE COMPUTING RESOURCES

(71) Applicant: Intel Corporation, Santa Clara, CA (US)

(72) Inventors: Katalin K. Bartfai-Walcott, El Dorado Hills, CA (US); Alexander Leckey, Kilcock (IE); John Kennedy, Clane (IE); Chris Woods, Dublin (IE); Giovani Estrada, Dublin (IE); Joseph Butler, Stamullen Co. Meath (IE); Michael J. McGrath, Virginia (IE); Slawomir Putyrski, Gdynia (PL)

(73) Assignee: Intel Corporation, Santa Clara, CA (US)

( * ) Notice: Subject to any disclaimer, the term of this patent is extended or adjusted under 35 U.S.C. 154(b) by 53 days.

(21) Appl. No.: 15/112,339

(22) PCT Filed: Feb. 23, 2015

(86) PCT No.: PCT/US2015/017101
§ 371 (c)(1),
(2) Date: Jul. 18, 2016

(87) PCT Pub. No.: WO2015/130613
PCT Pub. Date: Sep. 3, 2015

(65) Prior Publication Data
US 2016/0357610 A1 Dec. 8, 2016

Related U.S. Application Data

(60) Provisional application No. 61/945,753, filed on Feb. 27, 214, provisional application No. 61/945,757, filed on Feb. 27, 2014.

(51) Int. Cl.
*G06F 9/46* (2006.01)
*G06F 15/177* (2006.01)
(Continued)

(52) U.S. Cl.
CPC ......... *G06F 9/5077* (2013.01); *G06F 9/5027* (2013.01); *G06F 9/5061* (2013.01);
(Continued)

(58) Field of Classification Search
None
See application file for complete search history.

(56) References Cited

U.S. PATENT DOCUMENTS

| 7,966,308 B1 | 6/2011 | Outhred et al. |
| 8,266,254 B2 * | 9/2012 | Garrison ............... G06F 9/5061 709/220 |

(Continued)

FOREIGN PATENT DOCUMENTS

| CN | 102449622 A | 5/2012 |
| JP | 2013239095 A | 11/2013 |

(Continued)

OTHER PUBLICATIONS

International Preliminary Report on Patentability received for International Application No. PCT/US2015/017101, dated Sep. 9, 2016, 7 pages.

(Continued)

*Primary Examiner* — Bing Zhao
(74) *Attorney, Agent, or Firm* — Compass IP Law PC

(57) ABSTRACT

Examples may include techniques for allocating configurable computing resources from a pool of configurable computing resources to a logical server or virtual machine. The logical server or virtual machine may use allocated configurable computing resources to implement, execute or run a workload.

26 Claims, 10 Drawing Sheets

(51) Int. Cl.
*G06F 15/173* (2006.01)
*G06F 9/50* (2006.01)

(52) U.S. Cl.
CPC .......... *G06F 9/5072* (2013.01); *G06F 9/5094* (2013.01); *G06F 2209/501* (2013.01); *Y02D 10/22* (2018.01)

(56) References Cited

U.S. PATENT DOCUMENTS

| | | |
|---|---|---|
| 8,555,286 B2 | 10/2013 | Flores et al. |
| 2006/0090162 A1 | 4/2006 | Flores et al. |
| 2011/0145657 A1 | 6/2011 | Bishop et al. |
| 2012/0136990 A1 | 5/2012 | Denker et al. |
| 2013/0042123 A1 | 2/2013 | Smith et al. |
| 2013/0055260 A1 | 2/2013 | Zlotkin |
| 2013/0086268 A1 | 4/2013 | Sloma et al. |
| 2013/0219068 A1* | 8/2013 | Ballani ................ G06F 9/5061 709/226 |
| 2013/0227558 A1 | 8/2013 | Du et al. |

FOREIGN PATENT DOCUMENTS

| | | |
|---|---|---|
| KR | 20120085433 A | 8/2012 |
| KR | 20130134569 A | 12/2013 |
| RU | 2406128 C2 | 12/2010 |
| RU | 2431186 C2 | 10/2011 |
| WO | 2015130613 A1 | 9/2015 |

OTHER PUBLICATIONS

English Translation of the Notice of Preliminary Rejection, Application No. 2016-7020376, dated Apr. 14, 2017, 4 pages.
Jeong-Won Kim, "Scheduling Scheme for Cloud Computing based on Workflow Characteristics," Journal of the Korea Society of Computer and Information, vol. 17 No. 9, Sep. 2012, 9 pages.
English Translation of the Notice of Allowance, Patent Application No. 10-2016-7020376, dated Sep. 28, 2017, 1 page.
Translation of Office Action and Search Report of the Russian Federation for Patent Application No. 2016130887, 7 pages.
Extended European Search Report for Patent Application No. 15754976.7, dated Oct. 17, 2017, 11 pages.
International Search Report and Written Opinion received for International Application No. PCT/US2015/017101, dated May 20, 2015, 10 pages.
Chinese First Office of P.R. China State Intellectual Property Office for Patent Application No. 201580006049.0, dated Aug. 16, 2018, 9 pages.

* cited by examiner

*Allocation Scoring & Ranking 300*

CPU Ranking 310

| UUID | Rack | Tray | t | p | u | c | Score |
|---|---|---|---|---|---|---|---|
| cpu-1 | 1 | 19 | 33 | 0.52 | 62 | 48 | 0.416042 |
| cpu-2 | 3 | 1 | 11 | 0.11 | 100 | 337 | 0.377975 |
| cpu-3 | 1 | 9 | 23 | 0 | 5 | 811 | 0.587687 |
| cpu-4 | 2 | 9 | 5 | 0.53 | 20 | 915 | 0.680698 |
| cpu-5 | 4 | 7 | 3 | 0.81 | 49 | 772 | 0.68904 |

Memory Ranking 320

| UUID | Rack | Tray | t | p | u | c | Score |
|---|---|---|---|---|---|---|---|
| mem-1 | 3 | 2 | 19 | 0.7 | 13 | 229 | 0.386745 |
| mem-2 | 2 | 7 | 4 | 0.63 | 46 | 605 | 0.560962 |
| mem-3 | 1 | 16 | 31 | 0.93 | 4 | 908 | 0.850638 |
| mem-4 | 4 | 18 | 40 | 0.28 | 6 | 398 | 0.474788 |
| mem-5 | 1 | 8 | 43 | 0.78 | 62 | 685 | 0.845781 |

Storage Ranking 330

| UUID | Rack | Tray | t | p | u | c | Score |
|---|---|---|---|---|---|---|---|
| stor-1 | 4 | 7 | 3 | 0.3 | 10 | 270 | 0.835200 |
| stor-2 | 2 | 4 | 15 | 0.15 | 15 | 250 | 0.765521 |
| stor-3 | 3 | 11 | 20 | 0.4 | 25 | 200 | 0.489457 |
| stor-4 | 2 | 12 | 5 | 0.05 | 8 | 100 | 0.365891 |
| stor-5 | 1 | 9 | 28 | 0.25 | 18 | 175 | 0.561234 |

Network Ranking 340

| UUID | Rack | Tray | t | p | u | c | Score |
|---|---|---|---|---|---|---|---|
| nw I/O-1 | 2 | 8 | 15 | 0.35 | 65 | 500 | 0.584527 |
| nw I/O-2 | 3 | 6 | 32 | 0.75 | 15 | 850 | 0.794231 |
| nw I/O-3 | 1 | 10 | 21 | 0.5 | 80 | 750 | 0.659875 |
| nw I/O-4 | 4 | 13 | 17 | 0.80 | 105 | 400 | 0.334589 |
| nw I/O-5 | 3 | 17 | 6 | 0.45 | 10 | 900 | 0.876915 |

*FIG. 3*

Workload Templates 600

| Template ID | Application Workload | Allocated Resources |
|---|---|---|
| 610 | Video Processing | cpu-3 |
| | | cpu-8 |
| | | mem-1 |
| | | nw I/O-5 |
| 620 | Encryption/Decryption | cpu-2 |
| | | cpu-5 |
| | | mem-7 |
| | | nw I/O-2 |
| | | nw I/O-4 |
| 630 | Web Server | cpu-6 |
| | | cpu-10 |
| | | mem-4 |
| | | stor-5 |
| | | nw I/O-1 |
| | | nw I/O-6 |
| 640 | Content Delivery NW | cpu-5 |
| | | cpu-11 |
| | | mem-6 |
| | | stor-1 |
| | | stor-2 |
| | | nw I/O-7 |
| | | nw I/O-8 |
| 650 | Database | cpu-1 |
| | | mem-2 |
| | | stor-6 |
| | | stor-7 |
| | | stor-8 |
| | | nw I/O-3 |

*FIG. 6*

Storage Medium 900

Computer Executable
Instructions for 800

*FIG. 9*

TECHNIQUES TO ALLOCATE CONFIGURABLE COMPUTING RESOURCES

CROSS-REFERENCE TO RELATED APPLICATIONS

The present application is a national stage application under 35 U.S.C. § 371 of International Application No. PCT/US2015/017101 filed on Feb. 23, 2015. Said application No. PCT/US2015/017101 claims the benefit of U.S. Provisional Application No. 61/945,753 filed Feb. 27, 2014, and the benefit of 61/945,757 filed Feb. 27, 2014. Said Application No. PCT/US2015/017101, said Application No. 61/945,753, and said Application No. 61/945,757 are hereby incorporated herein by reference in their entireties.

TECHNICAL FIELD

Examples described herein are generally related to pooled or configurable computing resources.

BACKGROUND

Technological advancements in networking have enabled the rise in use of pooled and/or configurable computing resources. These pooled and/or configurable computing resources may include physical infrastructure for cloud computing networks. The physical infrastructure may include one or more computing systems having processors, memory, storage, networking, etc. Management entities of these cloud computing networks may assign logical servers or virtual machines (VMs) to allocated portions of pooled and/or configurable computing resources in order to place or compose these logical servers to implement, execute or run a workload such as a certain types of applications. Various types of applications or application workloads may utilize this allocated infrastructure in a shared manner via access to these placed or composed logical servers.

BRIEF DESCRIPTION OF THE DRAWINGS

FIG. 3 illustrates an example allocation scoring and ranking.
FIG. 6 illustrates example workload templates.
FIG. 9 illustrates an example of a storage medium.

DETAILED DESCRIPTION

Figure 1:
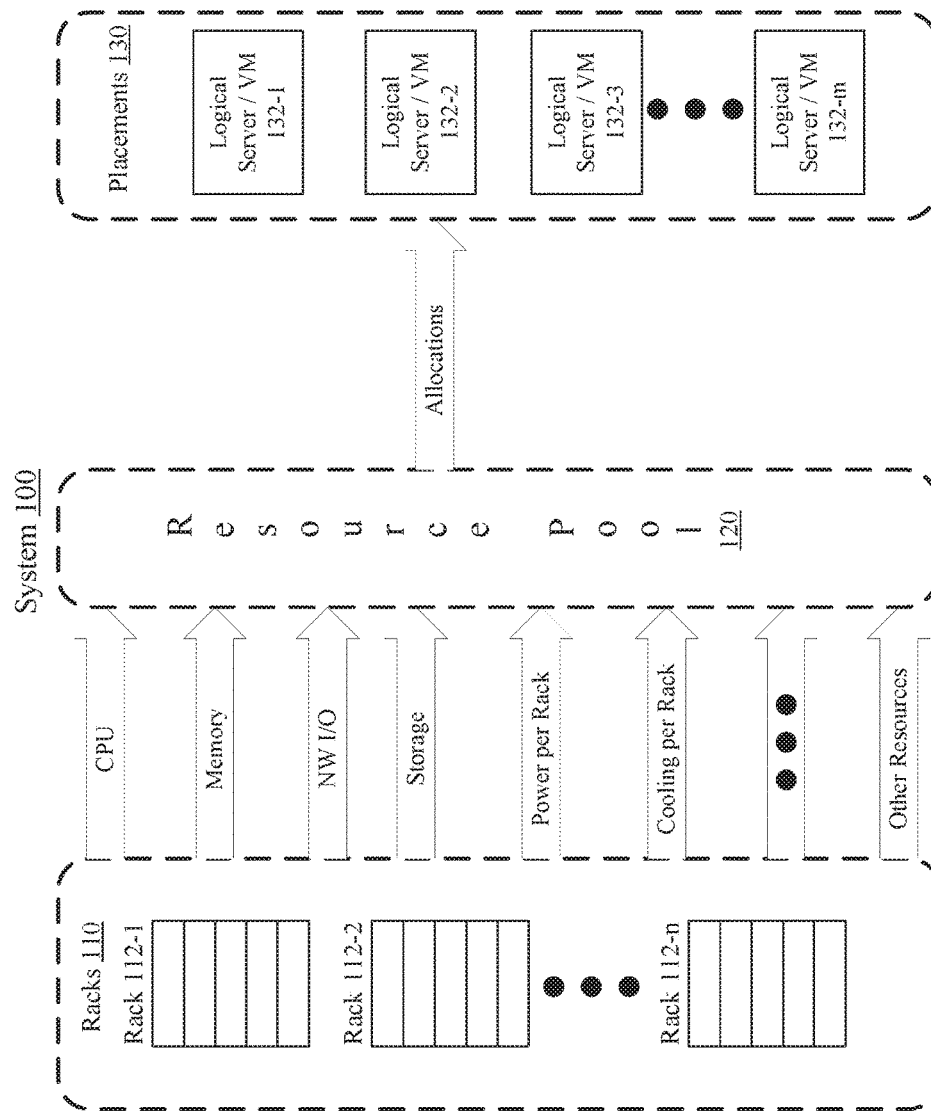
FIG. 1 illustrates an example system.

As contemplated in this disclosure various types of applications or application workloads may utilize allocated infrastructure in a shared manner via access to placed or composed logical servers or VMs that may be composed from selected pooled resources. These pooled resources may include configurable computing resources made up of disaggregated physical elements or components belonging to one or more types such as, but not limited to, a central processing unit (CPU) type, a memory type, a storage type, or network input/output (NW I/O) type. A simplest method to allocate pooled resources from these disaggregated physical elements to compose a logical server or VM is to use a round robin approach to ensure longevity for allocated disaggregated physical elements. Currently no known method exists to allocate pooled resources in a holistic way, such that any combination of key performance indicators (KPIs) are factored in, not just resource utilization but energy consumption, financial cost of resources or performance.

A technological initiative known as Rack Scale Architecture (RSA) includes servers logically composed from pools of disaggregated physical elements to implement or execute incoming workload requests. These RSA servers may be deployed in large data centers but are faced with at least two problems. First, initial selection of disaggregated physical elements to compose logical servers or VMs to implement, execute or run a workload, such that different stakeholders or users and their requirements (e.g., power, performance, maintenance, cost, etc.) are satisfied. Second, maintaining performance of initial allocations against required or mandated KPIs over continuous execution of workloads by composed logical servers or VMs. Since composed logical servers or VMs may also be part of software defined infrastructure (SDI), SDI-enabled data centers may include RSA servers that are dynamically composed to implement or execute workloads. As a result of being dynamically composed, not just the initial allocation but also continuous optimizations or adjustments at run time for execution of workloads needs consideration. These continuous optimizations or adjustments may also be based on satisfying different stakeholders or users and their requirements. It is with respect to these and/or other challenges that the examples described herein are needed.

In some examples, techniques to allocate configurable computing resources may be implemented that include receiving, at a resource manager for a system of configurable computing resources, a request to allocate the configurable computing resources to a logical server to implement or execute a workload. The techniques may also include determining a first weighted sum allocation score for a first portion of the configurable computing resources available for allocation to the logical server and determining a second weighted sum allocation score for a second portion of the configurable computing resources available for allocation to the logical server. The techniques may also include comparing the first and second weighted sum allocation scores to rank the first portion relative to the second portion and then allocating the first portion or the second portion to the logical server based on the rank.

FIG. 1 illustrates an example system 100. As shown in FIG. 1, system 100 includes racks 110, a resource pool 120 and placements 130. In some examples, as shown in FIG. 1, racks 110 may include racks 112-1, 112-1 to 112-*n*, where "n" is any positive integer greater than 2. Each rack may include various configurable computing resources. These configurable computing resources may include various types of disaggregated physical elements. Types of disaggregated physical elements may include, but are not limited to, CPU types, memory types (e.g., random access memory (RAM)), storage types (e.g., hard disk or solid state drives), NW I/O types (e.g., network interface cards), power types (e.g., power bricks), cooling types (e.g., fans or coolant) or other types of resources (e.g., network switch types). These configurable computing resources may be made available (e.g., to a resource manager or controller) in a resource pool such as resource pool 120.

According to some examples, as described more below, logic and/or features of a resource manager, controller or scheduler for a system such as system 100 may be capable of scoring and then ranking various configurable computing resources included in a resource pool such as resource pool 120 that may be available for allocation to a logical server or VM. A logical server or VM, for example, may be composed to implement or execute a workload. The allocation scoring and then ranking may be used to allocate at least a portion (e.g., a configuration) of available configurable computing resources in the resource pool to support placement or composition of logical servers or VMs such as those allocated for placements 130. As shown in FIG. 1, placements 130 include logical servers/VMs 132-1 to 132-m, where "m" is any positive integer greater than 3. The ranking, for example, may be an attempt to meet power, performance, cost, availability or maintenance requirements yet allow for system 100 to remain somewhat balanced over the long run due to possibly dynamic demands due to various operating scenarios that may cause modification to an allocated portion of the configurable computing resources. Hence, modifications to allocated portions may be needed.

In some examples, as described more below, logic and/or features of the resource manager, controller or scheduler for the system such as system 100 may also be capable of monitoring a plurality of operating attributes for each configurable computing resource allocated to compose or place a logical server or VM while the logical server or VM implements, runs or executes a workload. For these examples, the logic and/or features may score operating configurable computing resources and then rank that operating score compared to one or more historical operating scores determined for one or more other portions of the configurable computing resources that were previously allocated to implement or execute the workload. Modifications to those configurable computing resources allocated may or may not be made based on this ranking. For example, if the ranking of a first allocated configurable computing resource is ranked lower than historical operating scores of other configurable computing resources, the first allocated configurable computing resource may be replaced with a new configurable computing resource.

According to some examples, each logical server such as those shown in FIG. 1 for placements 130 may include one or more VMs. For these examples, each of the one or VMs may be allocated a portion of allocated configurable computing resources. In other examples, allocated configurable computing resources may be allocated directly to a given VM.

Figure 2:
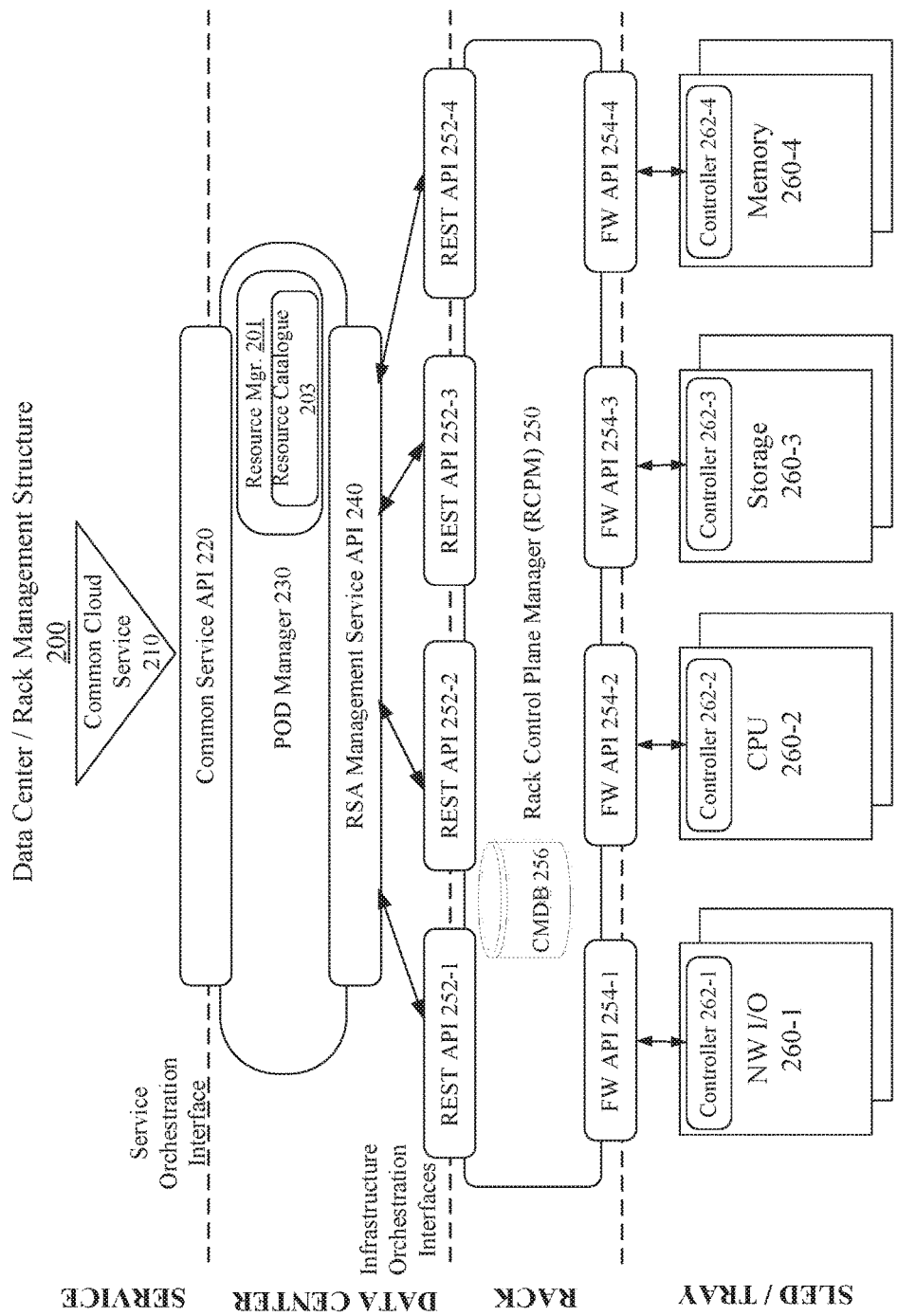
FIG. 2 illustrates an example data center/rack management structure.

FIG. 2 illustrates an example data center/rack management structure 200. In some examples, as shown in FIG. 2, rack management structure 200 includes various managers and application programming interfaces (APIs) to manage a data center having elements similar to system 100 shown in FIG. 1. For example, a common cloud service 210 may interface through a service orchestration interface shown in FIG. 2 as a common service application interface (API) 220 to communicate with a POD manager 230. POD manager 230 may be capable of managing a plurality of racks including various types of disaggregated physical elements.

According to some examples, POD manager 230 may include a resource manager 201 that includes logic and/or features capable of scoring, ranking and allocating these disaggregated physical elements responsive to a request from common cloud service 210 to allocate configurable computing resources to a logical server or VM to implement or execute a workload that may be associated with common cloud service 210. The workload, for example, may be an application workload such as, but not limited to, video processing, encryption/decryption, a web server, content delivery or a database. As described more below, resource manager 201 may maintain a resource catalog 203 to track what configurable computing resources have been allocated and also what configurable computing resources may be available to allocation responsive to subsequent requests from common cloud service 210.

In some examples, as shown in FIG. 2, POD manager 230 may have an RSA management service API 240 to couple via representational state transfer (REST) APIs 252-1 to 252-4 to rack control plane manager (RCPM) 250. REST APIs 252-1 to 252-4 may be a part of infrastructure orchestration interfaces maintained between RCPM 250 and one or more POD managers that includes POD manager 230 to provide access to the configurable computing resources at a rack level. This access may include access to disaggregated physical elements maintained at racks as well as metadata for technologies deployed in these racks that may include gathered operating attributes for these disaggregated physical elements. According to some examples, RCPM 250 may also provide access to the physical and logical asset landscapes or mapping via a local control management data base (CMDB) 256 in order to expedite identification of available assets and allocate configurable computing resources responsive to requests to compose or place a logical server or VM to implement or execute a workload.

According to some examples, RCPM 250 may provide a rack level user interface in order to fulfill several basic functions, such as discovery, reservation, polling, monitoring, scheduling and usage. Also, for these examples, RCPM 250 may be utilized for assembly of higher order computing resources in a multi-rack architecture (e.g., to execute a workload).

In some examples, RCPM 250 may report assets under its management to POD manager 230 that includes resource manager 201. For these examples, resource manager 201 may include logic and/or features capable of assisting POD manager 230 in aggregating an overall physical asset landscape structure from all racks included in POD of racks managed by POD manger 230 into a single multi-rack asset view. According to some examples, RCPM 250 may also receive and/or respond to requests from POD manager 230 via a REST APIs 252-1 to 252-4.

RCPM 250 may also interface with configurable computing resources including disaggregate physical elements of various types via firmware (FW) API's 254-1 to 254-4. For example, the various types of disaggregate physical elements are shown in FIG. 2 as network I/O 260-1, CPU 260-2, storage 260-3 and memory 260-4. Controllers 262-1 to 262-4 may interface with respective FW APIs 254-1 to 254-4 to facilitate or enable communication between RCPM 250 and these various types of disaggregate physical elements. In some examples, controllers 262-1 to 262-4 may include, but are not limited to, service processors or baseboard management controllers (BMCs).

According to some examples, POD manager 230 may receive a request to allocate a portion of the configurable computing resources maintained in a plurality of racks such as racks 112-1 to 112-n of system 100. For these examples, POD manager 230 may receive the request through common service API 210 in a standardized protocol format such as the Open Virtualization Format (OVF). OVF may include hints (e.g., metadata) of a type of workload. POD manager 230 may be capable of determining what hardware configuration may be needed to place or compose a logical server or VM to implement or execute the workload. POD manager 230 may then forward the request and indicate the hardware configuration possibly needed to resource manager 201. For example, a configuration of configurable computing resources including various types of disaggregate physical elements such as CPUs, memory, storage and NW I/O needed to implement, run or execute the workload.

In some examples, logic and/or features of resource manager 201 may be capable of scoring then ranking available configurable computing resources included in a resource pool such as resource pool 120 shown in FIG. 1 to allocate these available configurable computing resources to meet a disaggregated physical element configuration to implement, run or execute a workload. For these examples, the allocation scoring may be based on applying a weighted sum determined using example equation (1).

$$s_i = \sum_{i=1}^{n} \left( \frac{r_i}{r_{i,max}} \right) m_i \qquad \text{Equation (1)}$$

For example equation (1), the allocation score or $s_i$ is a sum of configurable computing resources $r_i$ (CPU, memory, storage, NW I/O, power, cooling, etc.) normalized to their respective maximum value $r_{i,max}$ times a weighting $m_i$. The weighting $m_i$ may allow certain attributes of configurable computing resources to be prioritized over other attributes of configurable computing resources (e.g., by a user). In some examples, $r_{i,max}$ may be based on, but not limited to, one or more subscriber licensing agreements (SLAs), maximum specifications from a manufacturer or tested operating parameters or attributes. In some examples, performance value $r_{i,max}$ may be automatically obtained from resource $r_i$, e.g., from a basic input/output system (BIOS), a suitable manufacturer read-only memory (ROM) or an SLA. In other examples, $r_{i,max}$ may be dynamically adjusted to reflect functionality. For example, by reducing $r_{i,max}$ of storage resources such as a hard drive when a deployed sensor in a rack (e.g., a SMART sensor) anticipates a failure or end-of-life value.

According to some examples, configurable computing resources included in a resource pool may be disaggregated physical elements maintained in different trays and/or racks. For these examples, RCPM 150 may be capable of tracking attributes in real-time for each configurable computing resource. For example, one or more NW I/Os included with network I/O 260-1, one or more CPUs included with CPU 260-2, one or more storage devices included with storage 260-3 or one or memory devices included with memory 260-4. The attributes may include, but are not limited to, temperature (t in Celsius), power/energy consumption (e in kilovolt-amps (kvA)), total uptime (u in hours) or unit cost (c in US $).

In some examples, a request may be received from common cloud service 210 to allocate configurable computing resources to a logical server or VM to implement or execute a workload. For these examples, logic and/or features at POD manager 230 may determine that the workload would need 1×CPU, 2 gigabytes (GB) of RAM, 1 terabyte (TB) of storage and a 10 gigabit (Gb) capable NW I/O device or NIC. Also, the request may indicate a template that may cause each attribute for these configurable computing resources to be weighted in particular manner.

According to some examples, the template may include, but is not limited to, a "cost sensitive" template, a "performance sensitive" template or a "high availability" template. The template indicated in the request may set a weighting or multiplier (m, Σ m=1) for each attribute. A cost sensitive template may have a weighting of $m_t$=0.2, $m_p$=0.2, $m_u$=0.1, $m_c$=0.5. The cost sensitive template may cause a highest weighting for unit cost c. A performance sensitive template may have a weighting of $m_t$=0.2, $m_p$=0.1, $m_u$=0.6, $m_c$=0.1. The performance sensitive template may cause a highest weighting for total uptime u but have lower relative weightings for unit cost u and power/energy consumption p. A high availability template may have a weighting of $m_t$=0.1, $m_p$=0.1, $m_u$=0.7, $m_c$=0.1. The high availability template may cause a highest weighting for total uptime u but have lower relative weightings for all the other attributes. A balanced template may have a balanced weighting of $m_t$=0.25, $m_p$=0.25, $m_u$=0.25, $m_c$=0.25.

In some examples, resource manager 201 at POD manager 230 may include logic and/or features to determine weighted sum allocation scores for each available configurable computing resource using example equation (2) and taking the lowest score over i.

$$s_i = m_t\left(\frac{t_i}{t_{max}}\right) + m_p\left(\frac{e_i}{e_{max}}\right) + m_u\left(\frac{u_i}{u_{max}}\right) + m_c\left(\frac{ct_i}{c_{max}}\right) \qquad \text{Equation (2)}$$

FIG. 3 illustrates an example allocation scoring and ranking 300. In some examples, based on arbitrary values for attributes (t, p, u and c) for CPUs, memory, storage and nw I/O, CPU ranking 310, memory ranking 320, storage ranking 330 and network ranking 340 may be generated using example equation (2). For these examples, the lowest allocation score for each type of disaggregated physical element is in bold-type to indicate a highest rank from among available configurable computing resources of like types. For example, the CPU having the lowest allocation score/highest ranking has a universal unique identifier (UUID) of cpu-2, the memory having the lowest allocation score/highest ranking has a UUID of mem-1, the storage having the lowest allocation score/highest ranking has a UUID of stor-4 and the network I/O having the lowest allocation score/highest ranking has a UUID of nw I/O-4.

According to some examples, the request mentioned above that was determined to need 1×CPU, 2 GB of RAM, 1 TB of storage and a 10 Gb capable NW I/O device or NIC would include cpu-2, mem-1, stor-4 and nw I/O-4 as the highest ranked configuration of available configurable computing resources and thus would be used to compose a logical server or VM to implement or execute the workload associated with the request. However, as mentioned more below, other considerations besides pure rankings may cause configurations that have configurable computing resources to be selected from separate racks (e.g., to meet high availability requirements).

In some examples, allocated configurable computing resources may be marked as reserved or unavailable while allocated to the logical server or VM composed to implement or execute the workload. For these examples, a resource catalogue (e.g., resource catalog 203) may be maintained by a resource manager (e.g., resource manager 201) to track what portion or portions of pooled resources have been allocated.

Figure 4:
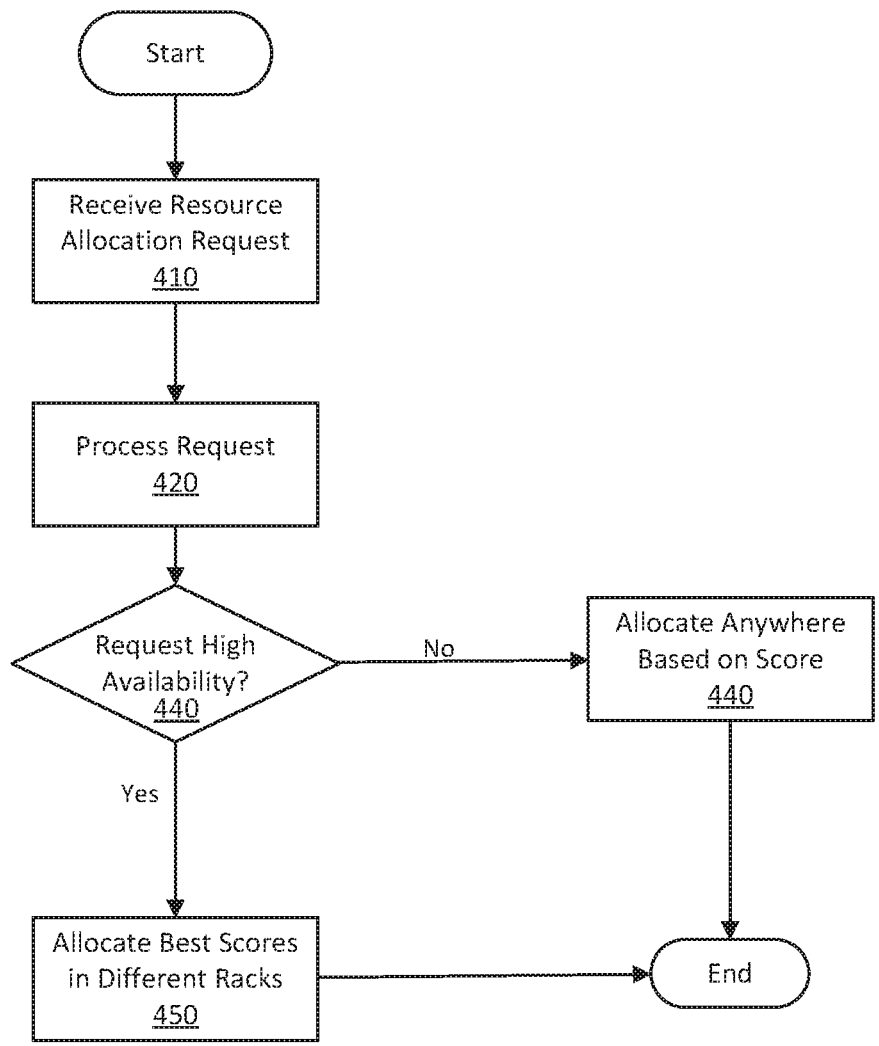
FIG. 4 illustrates an example first logic flow.

FIG. 4 illustrates an example first logic flow. As shown in FIG. 4, the first logic flow includes flow 400. In some examples, elements of system 100 and data center/rack measurement structure 200 as shown in FIGS. 1 and 2, rankings as shown in FIG. 3 or example equations (1) or (2) mentioned above may be used to illustrate example operations related to flow 400. The described example operations are not limited to implementations on system 100, data center/rack measurement structure 200, rankings shown in FIG. 3 or to example equations (1) or (2).

Moving from the start to block 410 (Receive Resource Allocation Request), logic or features at a resource manager may receive a resource allocation request (e.g., from a POD manager) to allocate available configurable computing resources. For example, resource manager 205 may receive a request from POD manager 230 to allocate resources from resource pool 120 to place one or more logical servers or VMs. The request may also indicate a template such as a cost sensitive, performance sensitive, high availability or balanced template that may have been indicated from common cloud service 210 to POD manager 230.

Proceeding from block 410 to block 420 (Process Request), the logic or features at the resource manager may rank the available configurable computing resources based on hardware configurations indicated in the resource allocation request. In some examples, logic or features of resource manager 201 may use example equations (1) and (2) to rank available resources from resource pool 120. Also, the template indicated in the request from common cloud service 210 may cause the logic or features to weight each attribute for these available configurable computing resources as mentioned above for FIG. 3.

Moving from block 420 to decision block 430 (Request High Availability?), the logic or features at the resource manager may determine whether the received allocation request indicated a request for high availability. If a request for high availability was indicated the process moves to block 450. Otherwise, the process moves to block 440.

In some examples, the request from common cloud service 210 may have indicated high availability via a high availability template. For these examples, the allocation request may have been originally received by POD manager 230 in an OVF format that included a flag indicator to indicate a need for high availability resources. For these examples, POD manager 230 may forward that indicator to resource manager 201. Resource manager 201 may then apply the high availability template to cause the logic or features to weight each operating attribute for available configurable computing resources.

Proceeding from decision block 430 to block 440 (Allocate Anywhere Based on Score), since high availability was not indicated, the logic or features at the resource manager may allocate a portion of the configurable resources from among any rack. In some examples, logic and/or features at resource manager 201 may allocate resources from resource pool 120 that may pull available resources from one or more of racks 112-1 to 112-n.

According some examples, the resource manager may include logic or features to update a resource catalogue to indicate allocation of configurable computing resources. For example, resource manager 201 may update resource catalogue 203.

Moving from decision block 430 to block 450 (Allocate Best Scores in Different Racks), since high availability was indicated, the logic or features at the resource manager allocates configurable resources with the best allocation scores from different racks. In some examples, resource manager 201 may allocate the resources from different racks to avoid a possibility of a hardware failure at a rack level. The resource may even be allocated to another data center according to an existing SLAs, and oversee exposure of storage in the aforementioned racks. In this way both highly-available services and input/output (IO) bound jobs for placed or composed logical servers or VMs may be preferentially allocated in separate racks to avoid overloading the same storage and maximize performance. The process may then come to an end.

In some examples, the resource manager may include logic or features to update a resource catalogue to indicate allocation of configurable computing resources. For example, resource manager 201 may update resource catalogue 203.

According to some examples, an example equation (3) may be used to determine when a configurable computing resource is exceeded or is operating above a maximum operating condition.

$$\left(1 - \frac{r_i}{r_{i,max}}\right) m_i \qquad \text{Equation (3)}$$

For these examples, depending on the sign, a weight $m_i$ can be interpreted as either a reward or a penalty per resource, and can in principle be a way to notify a resource manager to relocate resources elsewhere, e.g. a live migration due to exhausted resources or planned maintenance. In an example case of disaggregated hardware in a data center, a migration may amount to swapping only consumed resources for new ones. A live migration may be potentially less disruptive in this scenario.

Figure 5:
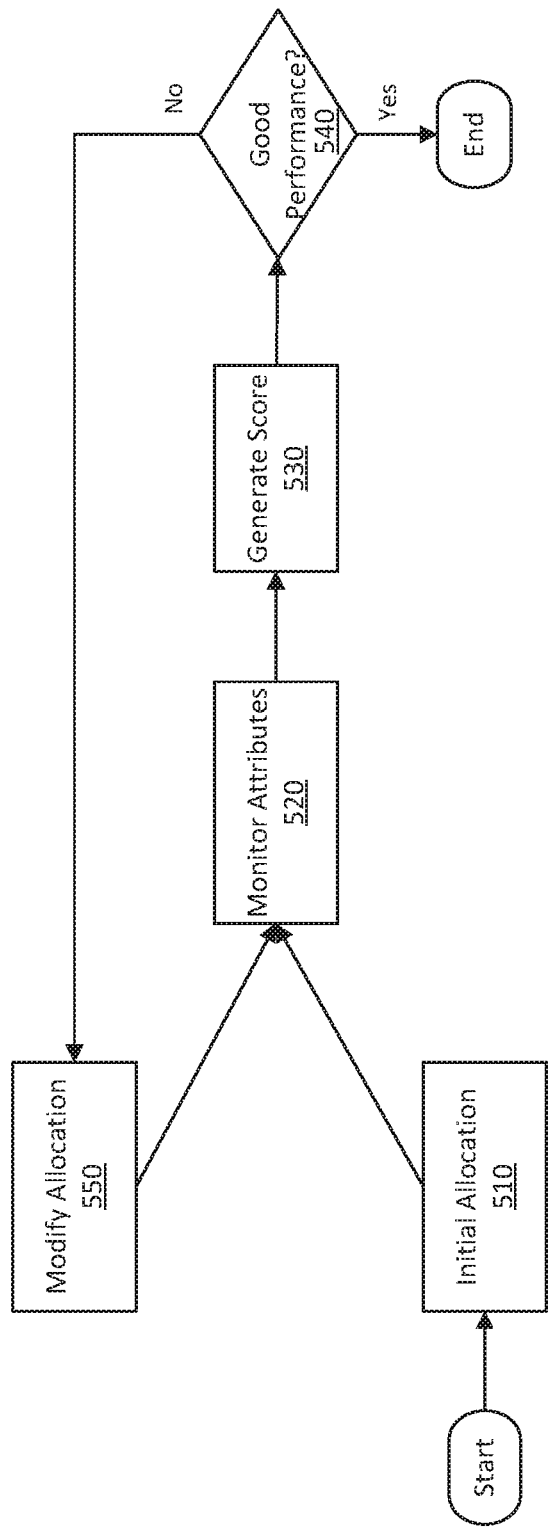
FIG. 5 illustrates an example second logic flow.

FIG. 5 illustrates an example second logic flow. As shown in FIG. 5, the second logic flow includes flow 500. In some examples, elements of system 100 and data center/rack measurement structure 200 as shown in FIGS. 1 and 2, example equations (1) to (3) mentioned above or flow 400 shown in FIG. 4 may be used to illustrate example operations related to flow 500. However, the described example operations are not limited to implementations on system 100, data center/rack measurement structure 200, rankings shown in FIG. 3, example equations (1) to (3) mentioned above or to flow 400.

Moving from the start to block 510 (Initial Allocation), logic or features at a resource manager may perform an initial allocation of configurable computing resources to a logical server or VM to implement, execute or run a workload as described above for flow 400 shown in FIG. 4. For example, resource manager 201 may allocate configurable computing resources from resource pool 120 that may include a plurality of disaggregate physical elements belonging to one or more types such as a CPU type, a memory type, a storage type or a nw I/O type that may be resident in one or more racks from among racks 110.

Proceeding from block 510 to block 520 (Monitor Attributes), logic or features at the resource manager may be capable of monitoring operating attributes for each configurable computing resource allocated to the logical server or VM to implement, execute or run the workload. In some examples, controllers located with disaggregate physical elements belonging to each type such as controllers 262-1 to 262-4 for nw I/O 260-1, CPU 260-2, storage 260-3 and memory 260-4 as shown in FIG. 2, may have a hardware monitoring configuration file that may be configured by resource manager 201. The hardware monitoring configuration file may be configured by resource manger 201 to specify to these controllers which operating attributes are to be monitored while the logical server or VM implements, executes or runs the workload. For example, for performance operating attributes controller 262-1 may monitor data throughput for nw I/O 260-1, controller 262-2 may monitor CPU utilization for CPU 260-2, controller 262-3 may monitor memory read/write times or controller 262-4 may monitor input/output latency for storage 262-4. The monitored operating attributes may then be collected by resource manager 201 responsive to an event, alarm or via periodic polling.

Proceeding from block 520 to block 530 (Generate Score), logic or features at the resource manager may be capable of generating or determining a first weighted sum operating score for the allocated configurable computing resources based on the monitored operating attributes while the logical server or VM implements or runs the workload. In some examples, the first weighted sum operating score, $S_1$ may be defined as a performance of the workload $W_j$ running on its allocated set of configurable computing resources. Where index 1 represents the configuration of configurable computing resources composed in a logical server or VM to implement, execute or run workload j. Example equation (4) may be used to determine a weighted sum operating score for $S_1(W_j)$:

$$S_i(W_j) = U_i(W_j)M_1 + P_i(W_j)M_2 + \frac{M_3}{C_i(W_j)} + \frac{M_4}{E_i(W_j)} \quad \text{Equation (4)}$$

For example equation (4), $U_i(W_j)$ may represent utilization of resources and $P_i(W_j)$ may represent performance for a configuration, both these parameters should be maximized. Also, for example equation (4), $C_i(W_j)$ may represent cost and $E_i(W_j)$ may represent energy consumption associated with running workload $W_j$, both these parameters should be minimized. Relative weightings ($M_1$, $M_2$, $M_3$, $M_4$) may be user-defined multipliers that may prioritize certain operating attribute scores. These relative weightings may be derived from an SLA for the workload. Similar to relative weightings $m_1$, $m_2$, $m_3$, $m_4$ mentioned above, (M, $\Sigma M=1$).

According to some examples, performance $P_i(W_j)$ may be an application-specific metric such as transactions per second, latency or any suitable KPI related to a given configuration i of a given workload j.

In some examples, utilization $U_i(W_j)$ may be determined by example equation (5):

$$100 * \left(\left(\frac{CPU_i}{CPU_{max}} + \frac{mem_i}{mem_{max}} + \frac{nwI/O_i}{nwI/O_{max}} + \frac{stor_i}{stor_{max}}\right) \div 4\right) \quad \text{Equation (5)}$$

to where $CPU_i$, $mem_i$, nw $I/O_i$ and $stor_i$ may represent median utilization of CPU, memory, nw I/O and storage types of disaggregate physical elements included in a given configuration i of a given workload j.

According to some examples, energy consumption $E_i(W_j)$ may be aggregated power required to run a given workload j calculated per logical server or VM. Energy consumption $E_i(W_j)$ may be determined by example equation (6):

$$100 * \quad \text{Equation (6)}$$
$$\left(\left(\frac{CPU_i}{CPU_{max}}VA_{CPU} + \frac{mem_i}{mem_{max}}VA_{mem} + \frac{nwI/O_i}{nwI/O_{max}}VA_{nwI/O} + \right.\right.$$

-continued
$$\left.\left.\frac{stor_i}{stor_{max}}VA_{stor}\right) \div 4\right)$$

where each utilized configurable computing resource may be multiplied by maximum VA consumed per different type of disaggregate physical element included in a given configuration i of a given workload j. In some examples, aggregate power may be obtained from a controller for a given type of disaggregate physical element. For example, aggregate power for CPU 260-1 may be obtained from controller 262-1.

In some examples, $C_i(W_j)$ may be determined while running a given workload j while using configurable computing resources included in a given configuration i using example equation (7):

$$100 * \left(\left(\frac{CPU_i v_{CPU}}{v_{CPU\_max}} + \frac{mem_i v_{mem}}{v_{mem\_max}} + \frac{nwI/O_i v_{nwI/O}}{v_{nwI/O\_max}} + \right.\right. \quad \text{Equation (7)}$$
$$\left.\left.\frac{stor_i v_{stor}}{v_{stor\_max}}\right) \div 4\right)$$

where v is a currency value (e.g., US $) for a configurable computing resource. For example equation (7), $v_{CPU}$, $v_{mem}$, $v_{nw\_I/O}$ and $v_{stor}$, the unit currency values of types of disaggregate physical elements such as CPU, memory, nw I/O and storage, respectively are used; as well as $V_{CPU\_max}$, etc., are used for normalization purposes. According to some examples, a resource catalogue maintained by the resource manager may be updated over time to reflect a depreciation policy. The depreciation policy may depend on the type of disaggregate physical element. Prices may be accessed online using a part number of each disaggregate physical element or may be vendor provided.

Proceeding from block 530 to decision block 540 (Good Performance?), logic or features at the resource manager may rank the determined first operating sum score $S_1(W_j)$ using example equation (4) and then ranking the first operating sum score $S_1(W_j)$ compared to one or more historical weighted sum operating scores $Si(W_j)$ determined for one or more other configurations i of configurable computing resources composed in a logical server or VM to implement, execute or run workload j. For these examples, good performance may be based on meeting associated KPI's that may be part of an SLA for the workload j to warranty an appropriate performance and resource re-allocation as new configurable computing resources are added or subtracted from the system or data center. If good performance is determined (e.g., meets associated KPI's or ranks favorably compared to historical configurations) the process comes to an end. Otherwise, the process moves to block 550.

Moving from decision block 540 to block 550 (Modify Allocation), logic or features at the resource manager may modify the allocation of configurable computing resources based on the first weighted sum operating score $S_1(W_j)$ having an unfavorable ranking compared to historical configurations and/or associated KPI's not being met. Modification may include selecting different CPUs, memory, nw I/O or storage to improve the operating sum score after monitoring, generating a second weighted sum operating score and then again comparing the second operating sum score to operating sum scores for historical configurations.

FIG. 6 illustrates example workload templates 600. In some examples, as shown in FIG. 6, workload templates includes templates 610, 620, 630, 640 or 650 for respective application workloads for video processing, encryption/decryption, web server, content delivery network or database. This disclosure is not limited to these examples of application workloads. Other application workloads are contemplated.

For the example templates shown in FIG. 6, allocated resources for particular application workloads may be arranged in a workload template that reflects those disaggregate physical elements that may consistently generate high ranking weighted sum operating scores. For examples, for template 610 and a video processing workload, cpu-3, cpu-8, mem-1 and nw I/O-5 may represent a best configuration having the highest or best ranked weighted sum operating score for a logical server or VM to implement, execute or run the video processing application workload based on historical operating attributes. Therefore, when a workload request for the video processing application is received template 610 may be used. In another example, for template 640 and a content delivery network, cpu-5, cpu-11, mem-6, stor-1, stor-2, nw I/O-7 and nw I/O-8 may represent a best configuration having the highest or best ranked weighted sum operating score for a logical server or VM to implement, execute or run the content delivery network application workload based on historical operating attributes. Therefore, when a workload request for the content deliver network application is received template 640 may be used.

Figure 7:
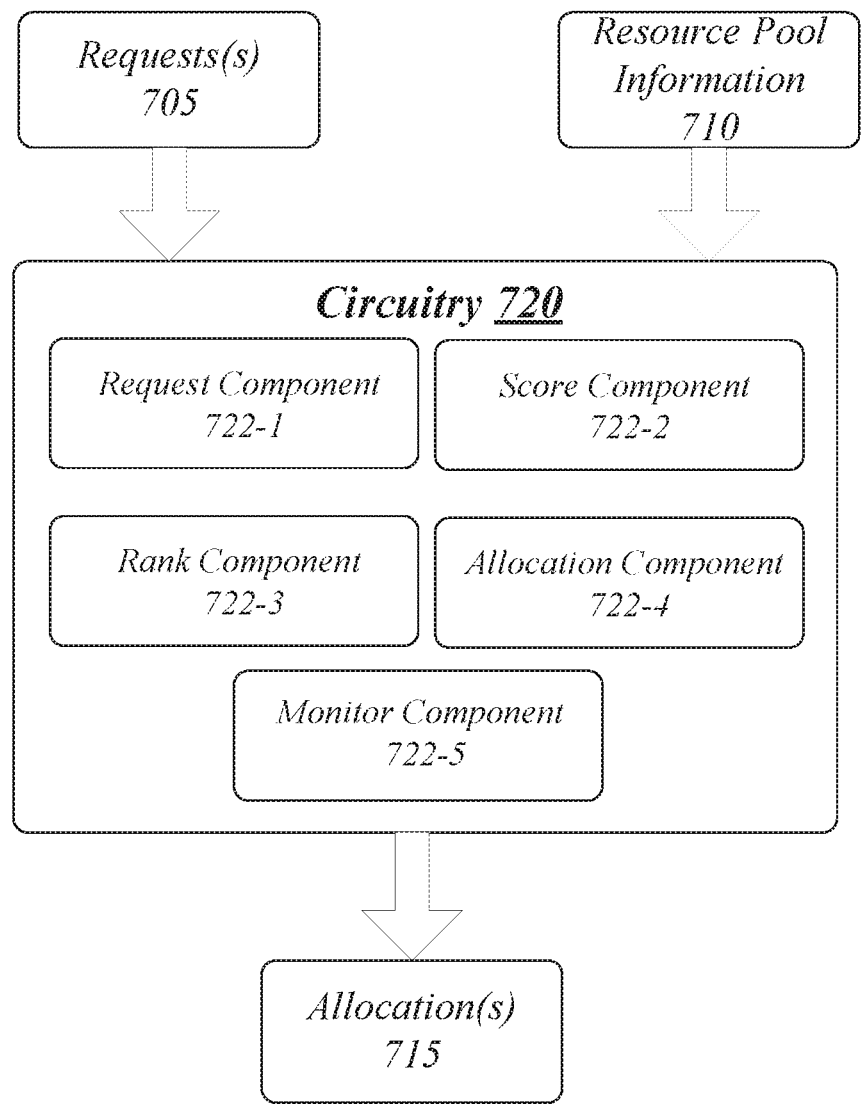
FIG. 7 illustrates an example block diagram for an apparatus.

FIG. 7 illustrates an example block diagram for an apparatus 700. Although apparatus 700 shown in FIG. 7 has a limited number of elements in a certain topology, it may be appreciated that the apparatus 700 may include more or less elements in alternate topologies as desired for a given implementation.

The apparatus 700 may be supported by circuitry 720 maintained at a computing device including logic or features to support a resource manager or controller to allocate configurable computing resources. Circuitry 720 may be arranged to execute one or more software or firmware implemented modules or components 722-*a*. It is worthy to note that "a" and "b" and "c" and similar designators as used herein are intended to be variables representing any positive integer. Thus, for example, if an implementation sets a value for a=5, then a complete set of software or firmware for components 722-*a* may include components 722-1, 722-2, 722-3, 722-4 or 722-5. The examples presented are not limited in this context and the different variables used throughout may represent the same or different integer values.

According to some examples, circuitry 720 may include a processor or processor circuitry. Circuitry 720 may be part of a computing device circuitry that includes processing cores (e.g., used as a central processing unit (CPU)). The circuitry including one or more processing cores can be any of various commercially available processors, including without limitation an AMD® Athlon®, Duron® and Opteron® processors; ARM® application, embedded and secure processors; Qualcomm® Snapdragon, IBM®, Motorola® DragonBall®, Nvidia®Tegra® and PowerPC® processors; IBM and Sony® Cell processors; Intel® Celeron®, Core (2) Duo®, Core i3, Core i5, Core i7, Itanium®, Pentium®, Xeon®, Atom®, and XScale® processors; and similar processors. Dual microprocessors, multi-core processors, and other multi-processor architectures may also be employed as part of circuitry 720. According to some examples circuitry 720 may also be an application specific integrated circuit (ASIC) and at least some components 722-*a* may be implemented as hardware elements of the ASIC.

According to some examples, apparatus 700 may include a request component 722-1. Request component 722-1 may be executed by circuitry 720 to receive a request to allocate configurable computing resources to a logical server or VM to implement, execute or run a workload. For these examples, the request may be included in request(s) 705 and may indicate a hardware configuration that may be needed to place or compose the one or more logical servers or VMs. Request(s) 705 may also indicate a template to set a weighting or multiplier for various attributes for the hardware configuration. For examples, cost sensitive, performance sensitive, high availability or balanced templates may be included in request(s) 705 that may differently weight configurable computing resource attributes such as, but not limited to, temperature, power, utilization or cost.

According to some examples, apparatus 700 may also include a score component 722-2. Score component 722-2 may be executed by circuitry 720 to determine a first weighted sum allocation score for a first portion of the configurable computing resources available for allocation to the logical server or VM and determine a second weighted sum allocation score for a second portion of the configurable computing resources available for allocation to the logical server or VM. For these examples, the weighted sum allocation score may be based on example equations (1) and (2) as described above. The available configurable computing resources, for example, may be taken from disaggregated physical elements such as CPUs, memory, nw I/O or storage maintained in one or more racks of a data center (e.g., racks 110 of system 100). Resource pool information 710 may include an indication of those available configurable computing resources and may also include information regarding configurable computing resource attributes such as, but not limited to, temperature, power, utilization or cost. For example, temperature, power, utilization or cost attributes for various available CPUs, memory, nw I/O or storage maintained in the one or more racks.

In some examples, apparatus 700 may also include a rank component 722-3. Rank component 722-3 may be executed by circuitry 720 to compare the first and second weighted sum allocation scores assigned to available configurable computing resources by score component 722-2. The comparison, for example, may include rank component 722-3 using the first and second weighted sum allocation scores to rank the first portion relative to the second portion of the configurable computing resources.

According to some examples, apparatus 700 may also include an allocation component 722-4. Allocation component 722-4 may be executed by circuitry 720 to allocate the first portion or the second portion to the logical server or VM based on the comparison by rank component 722-3. For these examples, allocation component 722-4 may indicate the allocation in allocation(s) 715 that may be sent to a POD manager and/or to one or more RCPMs associated with racks having allocated resources. Allocation component 722-4 may also update a resource catalogue to indicate allocation of the first or second portion to the logical server or VM.

In some examples, apparatus 700 may also include a monitor component 722-5. Monitor component 722-5 may be executed by circuitry 720 to monitor a plurality of operating attributes for each configurable computing resource included in allocated first or second portions as the logical server or VM implements, runs or executes the workload.

According to some examples, the first portion of the configurable computing resources may be allocated by allocation component 722-4 to the logical server or VM to implement, execute or run the workload. Monitor component 722-5 may then monitor the plurality of operating attributes for each configurable computing resource included in the first portion as the logical server or VM implements, executes or runs the workload. Score component 722-2 may then determine a first weighted sum operating score for the first portion based on the plurality of operating attributes monitored by monitor component 722-5. For these examples, score component 722-2 may determine the first weighted sum operating score using example equations (4) through (7) to determine the first weighted sum operating score. Rank component 722-3 may then rank the first weighted sum operating score compared to one or more historical weighted sum operating scores determined for one or more other portions of the configurable computing resources previously allocated to implement or run the workload. Allocation component 722-4 may then modify what configurable computing resources are included in the first portion based on the ranking. For these examples, allocation component 722-4 may indicate any modifications to previous allocations in allocation(s) 715 to the POD manager and/or to the one or more RCPMs associated with racks having allocated or previously allocated resources.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

Figure 8:
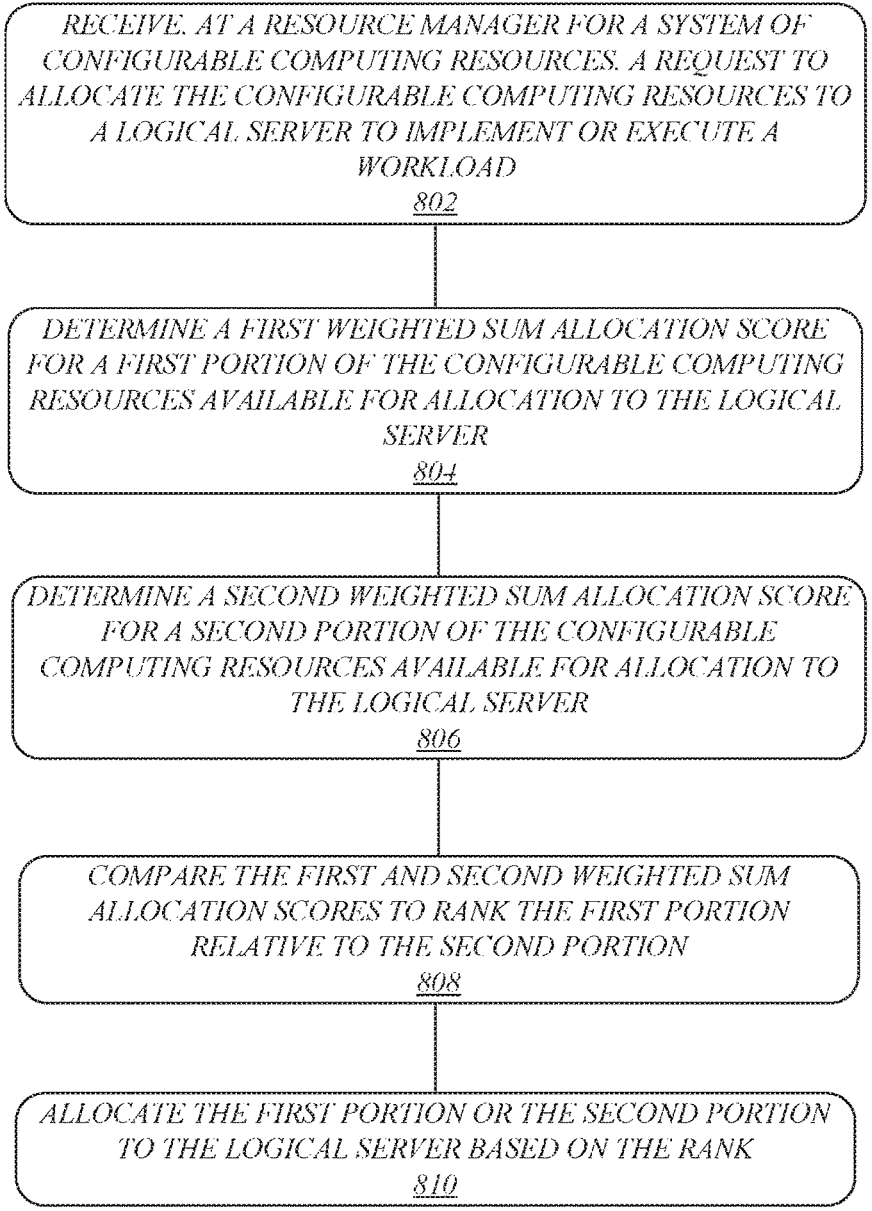
FIG. 8 illustrates an example of third logic flow.

FIG. 8 illustrates an example of a logic flow. As shown in FIG. 8 the logic flow includes a logic flow 800. Logic flow 800 may be representative of some or all of the operations executed by one or more logic, features, or devices described herein, such as apparatus 700. More particularly, logic flow 800 may be implemented by at least request component 722-1, score component 722-2, rank component 722-3 or allocate component 722-4.

According to some examples, logic flow 800 at block 802 may receive, at a resource manager for a system of configurable computing resources, a request to allocate the configurable computing resources to a logical server to implement or execute a workload. For these examples, the request may be received by request component 722-1.

In some examples, logic flow 800 at block 804 may determine a first weighted sum allocation score for a first portion of the configurable computing resources available for allocation to the logical server. For these examples, score component 722-2 may determine the first weighted sum allocation score.

According to some examples, logic flow 800 at block 806 may determine a second weighted sum allocation score for a second portion of the configurable computing resources available for allocation to the logical server. For these examples, score component 722-2 may determine the second weighted sum allocation score.

In some example, logic flow 800 at block 808 may compare the first and second weighted sum allocation scores to rank the first portion relative to the second portion. For these examples, rank component 722-3 may compare the first and second weighted sum allocation scores to rank the portions relative to each other.

In some examples, logic flow 800 at block 810 may allocate the first portion or the second portion to the logical server based on the rank. For these examples, allocate component 722-4 may cause or implement the allocation.

FIG. 9 illustrates an example of a storage medium 900. Storage medium 900 may comprise an article of manufacture. In some examples, storage medium 900 may include any non-transitory computer readable medium or machine readable medium, such as an optical, magnetic or semiconductor storage. Storage medium 900 may store various types of computer executable instructions, such as instructions to implement logic flow 800. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 10:
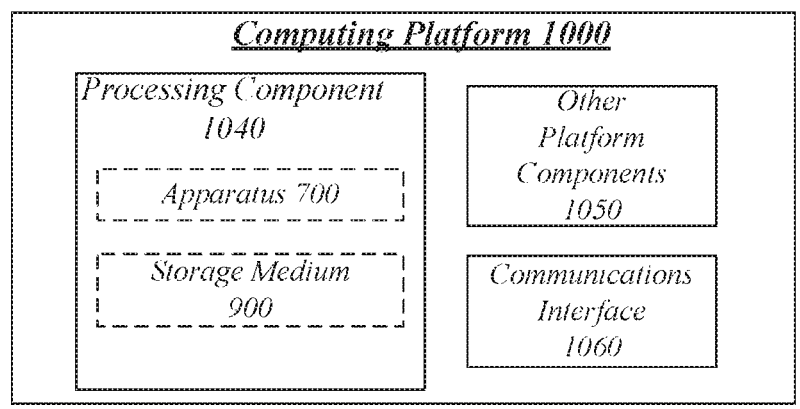
FIG. 10 illustrates an example computing platform.

FIG. 10 illustrates an example computing platform 1000. In some examples, as shown in FIG. 10, computing platform 1000 may include a processing component 1040, other platform components or a communications interface 1060. According to some examples, computing platform 1000 may be implemented in a computing device such as a server in a system such as a data center or server farm that supports a POD manager and/or a resource manager for allocating configurable computing resources as mentioned above.

According to some examples, processing component 1040 may execute processing operations or logic for apparatus 700 and/or storage medium 900. Processing component 1040 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 1050 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 1060 may include logic and/or features to support a communication interface. For these examples, communications interface 1060 may include one or more communication interfaces that operate according to various communication protocols or standards to communicate over direct or network communication links. Direct communications may occur via use of communication protocols or standards described in one or more industry standards (including progenies and variants) such as those associated with the PCI Express specification. Network communications may occur via use of communication protocols or standards such those described in one or more Ethernet standards promulgated by the Institute of Electrical and Electronics Engineers (IEEE). For example, one such Ethernet standard may include IEEE 802.3-2008, Carrier sense Multiple access with Collision Detection (CSMA/CD) Access Method and Physical Layer Specifications, Published in December 2008 (hereinafter "IEEE 802.3"). Network communication may also occur according to one or more OpenFlow specifications such as the OpenFlow Hardware Abstraction API Specification. Network communications may also occur according to Infiniband Architecture Specification, Volume 1, Release 1.2.1, published in November 2007 ("the Infiniband Architecture specification").

Computing platform 1000 may be part of a computing device that may be, for example, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof. Accordingly, functions and/or specific configurations of computing platform 1000 described herein, may be included or omitted in various embodiments of computing platform 1000, as suitably desired.

The components and features of computing platform 1000 may be implemented using any combination of discrete circuitry, application specific integrated circuits (ASICs), logic gates and/or single chip architectures. Further, the features of computing platform 1000 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary computing platform 1000 shown in the block diagram of FIG. 10 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming to language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The following examples pertain to additional examples of technologies disclosed herein.

Example 1

An example apparatus may include circuitry for a controller of a system of configurable computing resources. The apparatus may also include a request component for execution by the circuitry to receive a request to allocate the configurable computing resources to a logical server to implement or execute a workload. The apparatus may also include a score component for execution by the circuitry to determine a first weighted sum allocation score for a first portion of the configurable computing resources available for allocation to the logical server and determine a second weighted sum allocation score for a second portion of the configurable computing resources available for allocation to the logical server. The apparatus may also include a rank component for execution by the circuitry to compare the first and second weighted sum allocation scores. The apparatus may also include an allocation component for execution by the circuitry to allocate the first portion or the second portion to the logical server based on the comparison.

Example 2

The apparatus of example 1, the allocation component may update a resource catalogue to indicate allocation of the first or second portions to the logical server.

Example 3

The apparatus of example 1, the system of configurable computing resources may include the configurable computing resources maintained in a plurality of racks.

Example 4

The apparatus of example 3, the first and second portions of configurable computing resources may include respective first and second configurations each having a plurality of disaggregate physical elements belonging to one or more types. The score component may determine the first and second weighted scores based on disaggregate physical elements of a same type that are physically located in different racks from among the plurality of racks. The allocation component to allocate the first portion or the second portion of the configurable computing resources based on the comparison of the first and second weighted scores by the rank component and based on the request indicating an allocation to meet high availability requirements.

Example 5

The apparatus of example 4, the one or more types may include a central processing unit type, a memory type, a storage type or a network input/output type.

Example 6

The apparatus of example 1, the first and second weighted scores may be weighted based on whether the request indicates that the configurable computing resources are to be allocated based on one of a cost sensitive template, a performance sensitive template, a high availability template or a balanced template.

Example 7

The apparatus of example 6, the first and second weighted sum allocation scores may be determined by the score component based on a plurality of allocation attributes for each configurable computing resource included in respective first and second portions of the configurable computing resources.

Example 8

The apparatus of example 7, the plurality of allocation attributes may include an operating temperature, power/energy consumption, total uptime in hours or unit cost.

Example 9

The apparatus of example 8, the cost sensitive template may cause unit cost to have a highest weighting among the plurality of allocation attributes or the performance sensitive and high availability templates may cause total uptime to have the highest weighting among the plurality of allocation attributes.

Example 10

The apparatus of example 1, the allocation component may allocate the first portion of the configurable computing resources to the logical server to implement or execute the workload. The apparatus may also include a monitor component for execution by the circuitry to monitor a plurality of operating attributes for each configurable computing resource included in the first portion as the logical server implements or executes the workload. The score component may determine a first weighted sum operating score for the first portion based on the plurality of operating attributes monitored by the monitor component. The rank component may rank the weighted sum operating score compared to one or more historical weighted sum operating scores determined for one or more other portions of the configurable computing resources previously allocated to implement or execute the workload. The allocation component may modify what configurable computing resources are included in the first portion based on the rank.

Example 11

The apparatus of example 10, the first weighted sum operating score may be weighted based on a service level agreement for the workload.

Example 12

The apparatus of example 1, the first and second portions of configurable computing resources may include respective first and second configurations each having a plurality of disaggregate physical elements belonging to one or more types. The one or more types may include a central processing unit type, a memory type, a storage type or a network input/output type.

Example 13

The apparatus of example 1 may also include a digital display coupled to the circuitry to present a user interface view.

Example 14

An example method may include receiving, at a resource manager for a system of configurable computing resources, a request to allocate the configurable computing resources to a logical server to implement or execute a workload. The method may also include determining a first weighted sum allocation score for a first portion of the configurable computing resources available for allocation to the logical server. The method may also include determining a second weighted sum allocation score for a second portion of the configurable computing resources available for allocation to the logical server. The method may also include comparing the first and second weighted sum allocation scores to rank the first portion relative to the second portion. The method may also include allocating the first portion or the second portion to the logical server based on the rank.

Example 15

The method of example 14 may also include updating a resource catalogue to indicate allocation of the first or second portions to the logical server.

Example 16

The method of example 14, the system of configurable computing resources may include the configurable computing resources maintained in a plurality of racks.

Example 17

The method of example 16, the first and second portions of configurable computing resources may include respective first and second configurations each having a plurality of disaggregate physical elements belonging to one or more types. The method may also include determining the first and second weighted scores based on disaggregate physical elements of a same type being physically located in different racks from among the plurality of racks. The method may also include allocating the first portion or the second portion of the configurable computing resources based on the comparison of the first and second weighted scores and based on the request indicating an allocation to meet high availability requirements.

Example 18

The method of example 17, the one or more types may include a central processing unit type, a memory type, a storage type or a network input/output type.

Example 19

The method of example 14, the first and second weighted scores may be weighted based on whether the request indicates that the configurable computing resources are to be allocated based on one of a cost sensitive template, a performance sensitive template, a high availability template or a balanced template.

Example 20

The method of example 19, the first and second weighted sum allocation scores may be based on a plurality of allocation attributes for each configurable computing resource included in respective first and second portions of the configurable computing resources.

Example 21

The method of example 20, the plurality of allocation attributes may include an operating temperature, power/energy consumption, total uptime in hours or unit cost.

Example 22

The method of example 21, the cost sensitive template may cause unit cost to have a highest weighting among the plurality of allocation attributes or the performance sensitive and high availability templates may cause total uptime to have the highest weighting among the plurality of allocation attributes.

Example 23

The method of example 14 may also include allocating the first portion of the configurable computing resources to the logical server to implement or execute the workload. The method may also include monitoring a plurality of operating attributes for each configurable computing resource included in the first portion as the logical server implements or executes the workload. The method may also include determining a first weighted sum operating score for the first portion based on the plurality of monitored operating attributes. The method may also include ranking the first weighted sum operating score compared to one or more historical weighted sum operating scores determined for one or more other portions of the configurable computing resources previously allocated to implement or execute the workload. The method may also include modifying what configurable computing resources are included in the first portion based on the ranking.

Example 24

The method of example 23, the first weighted sum operating score weighted may be based on a service level agreement for the workload.

Example 25

The method of example 14, the first and second portions of configurable computing resources may include respective first and second configurations each having a plurality of disaggregate physical elements belonging to one or more types, the one or more types may include a central processing unit type, a memory type, a storage type or a network input/output type.

Example 26

An example at least one machine readable medium may include a plurality of instructions that in response to being executed by system may cause the system to carry out a method according to any one of examples 14 to 25.

Example 27

An example apparatus may include means for performing the methods of any one of examples 14 to 25.

Example 28

An example at least one machine readable medium may include a plurality of instructions that in response to being executed by circuitry located with a system of configurable computing resources may cause the circuitry to receive a request to allocate the configurable computing resources to a logical server to implement or execute a workload. The instructions may also cause the circuitry to determine a first weighted sum allocation score for a first portion of the configurable computing resources available for allocation to the logical server. The instructions may also cause the circuitry to determine a second weighted sum allocation score for a second portion of the configurable computing resources available for allocation to the logical server. The instructions may also cause the circuitry to compare the first and second weighted sum allocation score to rank the first portion relative to the second portion. The instructions may also cause the circuitry to allocate the first portion or the second portion to the logical server based on the rank.

Example 29

The at least one machine readable medium of example 28, the instructions may further cause the circuitry to update a resource catalogue to indicate allocation of the first or second portions to the logical server.

Example 30

The at least one machine readable medium of example 28, the system of configurable computing resources may include the configurable computing resources maintained in a plurality of racks.

Example 31

The at least one machine readable medium of example 30, the first and second portions of configurable computing resources may include respective first and second configurations each having a plurality of disaggregate physical elements belonging to one or more types, the instructions to further cause the circuitry to determine the first and second weighted scores based on disaggregate physical elements of a same type being physically located in different racks from among the plurality of racks. The instructions may also cause the circuitry to allocate the first portion or the second portion of the configurable computing resources based on the comparison of the first and second weighted scores and based on the request indicating an allocation to meet high availability requirements.

Example 32

The at least one machine readable medium of example 31, the one or more types may include a central processing unit type, a memory type, a storage type or a network input/output type.

Example 33

The at least one machine readable medium of example 28, the first and second weighted scores may be weighted based on whether the request indicates that the configurable computing resources are to be allocated based on one of a cost sensitive template, a performance sensitive template, a high availability template or a balanced template.

Example 34

The at least one machine readable medium of example 33, the first and second weighted sum allocation scores may be based on a plurality of allocation attributes for each configurable computing resource included in respective first and second portions of the configurable computing resources.

Example 35

The at least one machine readable medium of example 34, the plurality of allocation attributes may include an operating temperature, power/energy consumption, total uptime in hours or unit cost.

Example 36

The at least one machine readable medium of example 35, the cost sensitive template may cause unit cost to have a highest weighting among the plurality of allocation attributes or the performance sensitive and high availability templates may cause total uptime to have the highest weighting among the plurality of allocation attributes.

Example 37

The at least one machine readable medium of example 28, the instructions may further cause the circuitry to allocate the first portion of the configurable computing resources to the logical server to implement or execute the workload. The instructions may also cause the circuitry to monitor a plurality of operating attributes for each configurable computing resource included in the first portion as the logical server implements or executes the workload. The instructions may also cause the circuitry to determine a first weighted sum operating score for the first portion based on the plurality of monitored operating attributes. The instructions may also cause the circuitry to rank the first weighted sum operating score compared to one or more historical weighted sum operating scores determined for one or more other portions of the configurable computing resources previously allocated to implement or execute the workload. The instructions may also cause the circuitry to modify what configurable computing resources are included in the first portion based on the ranking.

Example 38

The at least one machine readable medium of example 37, the first weighted sum operating score may be weighted based on a service level agreement for the workload.

Example 39

The at least one machine readable medium of example 28, the first and second portions of configurable computing resources may include respective first and second configurations each having a plurality of disaggregate physical elements belonging to one or more types, the one or more types may include a central processing unit type, a memory type, a storage type or a network input/output type.

It is emphasized that the below Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," " "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An apparatus comprising:
   circuitry for a controller of a system of configurable computing resources;
   a request component for execution by the circuitry to receive a request to allocate the configurable computing resources to a logical server to implement or execute a workload;
   a score component for execution by the circuitry to generate a first weighted sum allocation score for a first portion of the configurable computing resources available for allocation to the logical server and generate a second weighted sum allocation score for a second portion of the configurable computing resources available for allocation to the logical server, the first and second portions of configurable computing resources including respective first and second configurations each having a plurality of disaggregate physical elements belonging to one or more types, the one or more types including a central processing unit type, a memory type, a storage type or a network input/output type, respective first and second weighted sum allocation scores generated using respective normalized performance values, where the normalized performance values correspond to at least two different respective types of allocation attributes selected from types of an operating temperature, a power/energy consumption, a total uptime in hours or a unit cost, for individual disaggregate physical elements included in the respective first and second configurations, the respective performance values separately multiplied by a plurality of separate weighting factors for the different respective types of allocation attributes for the individual disaggregate physical elements and then summed to generate the respective first and second sum allocation scores;
   a rank component for execution by the circuitry to compare the first and second weighted sum allocation scores to rank the first portion relative to the second portion; and
   an allocation component for execution by the circuitry to allocate the first portion or the second portion to the logical server based on the rank.

2. The apparatus of claim 1, the allocation component to update a resource catalogue to indicate allocation of the first or second portions to the logical server.

3. The apparatus of claim 1, the system of configurable computing resources comprises the configurable computing resources maintained in a plurality of racks.

4. The apparatus of claim 1, comprising:
   the first weighted sum allocation score is $s_1$ and $$s_1 = m_t\left(\frac{t_1}{t_{max}}\right) + m_p\left(\frac{e_1}{e_{max}}\right) + m_u\left(\frac{u_1}{u_{max}}\right) + m_c\left(\frac{c_1}{c_{max}}\right),$$

where "$t_1$" represents the operating temperature allocation attribute for the first portion, "$t_{max}$" represents a maximum value for operating temperature for the first portion, "$e_1$" represents the power/energy consumption allocation attribute for the first portion, $e_{max}$ represents a maximum value for power/energy consumption for the first portion, "$u_1$" represents the total uptime in hours allocation attribute for the first portion, $u_{max}$" represents a maximum value for total uptime for the first portion, "$c_1$" represents the unit cost allocation attribute for the first portion, $c_{max}$ represents a maximum value for unit cost for the first portion, and "$m_t$, $m_p$, $m_u$, $m_c$" for $s_1$ represent individual weighting factors for different respective types of allocation attributes for the first portion; and the second weighted sum allocation score is $s_2$ and $$s_2 = m_t\left(\frac{t_2}{t_{max}}\right) + m_p\left(\frac{e_2}{e_{max}}\right) + m_u\left(\frac{u_2}{u_{max}}\right) + m_c\left(\frac{c_2}{c_{max}}\right),$$

where "$t_2$" represents the operating temperature allocation attribute for the second portion, "$t_{max}$" represents a maximum value for operating temperature for the second portion, "$e_2$" represents the power/energy consumption allocation attribute for the second portion, $e_{max}$" represents a maximum value for power/energy consumption for the second portion, "$u_2$" represents the total uptime in hours allocation attribute for the second portion, $u_{max}$" represents a maximum value for total uptime for the second portion, "$c_2$" represents the unit cost allocation attribute for the second portion, $c_{max}$" represents a maximum value for unit cost for the second portion, and "$m_t$, $m_p$, $m_u$, $m_c$" for $s_2$ represent individual weighting factors for different respective types of allocation attributes for the second portion.

5. The apparatus of claim 4, the plurality of weighting factors for the different respective types of allocation attributes for the individual disaggregate physical elements are based on whether the request indicates that the configurable computing resources are to be allocated based on one of a cost sensitive template, a performance sensitive template, a high availability template or a balanced template.

6. The apparatus of claim 1, the plurality of weighting factors for the different respective types of allocation attributes, when added together or summed, have a value equal to 1.

7. The apparatus of claim 5, the cost sensitive template to cause $m_c$ for both $s_1$ and $s_2$ to have a highest weighting compared to $m_t$, $m_p$ or $m_u$ or the performance sensitive and high availability templates to cause $m_u$ for both $s_1$ and $s_2$ to have the highest weighting compared to $m_t$, $m_p$ or $m_u$.

8. The apparatus of claim 1, comprising:
the allocation component to allocate the first portion of the configurable computing resources to the logical server to implement or execute the workload;
a monitor component for execution by the circuitry to monitor a plurality of operating attributes for each configurable computing resource included in the first portion as the logical server implements or executes the workload;
the score component to generate a first weighted sum operating score for the first portion based on the plurality of operating attributes monitored by the monitor component;
the rank component to rank the weighted sum operating score compared to one or more historical weighted sum operating scores determined for one or more other portions of the configurable computing resources previously allocated to implement or execute the workload; and
the allocation component to modify what configurable computing resources are included in the first portion based on the rank.

9. The apparatus of claim 8, the first weighted sum operating score weighted based on a service level agreement for the workload.

10. The apparatus of claim 8, the first weighted sum operating score is $S_1(W_j)$ and $$S_1(W_j) = U_1(W_j)M_1 + P_1(W_j)M_2 + \frac{M_3}{C_1(W_j)} + \frac{M_4}{E_1(W_j)},$$

where "j" represents the workload implemented or executed by the logical server, "$U_1(W_j)$" represents a utilization operating attribute for resources included in the first configuration while the logical server implements or executes the workload, "$P_1(W_j)$" represents a performance operating attribute of the first configuration while the logical server implements or executes the workload, "$C_1(W_j)$" represents a cost operating attribute for costs associated with the logical server implementing or executing the workload, "$E_1(W_j)$" represents an energy operating attribute for energy consumption while the logical server implements or executes the workload, and "$M_1$, $M_2$, $M_3$, $M_4$" represent separate multipliers to prioritize respective types of utilization, performance, cost and energy consumption operating attributes.

11. The apparatus of claim 1, comprising a digital display coupled to the circuitry to present a user interface view.

12. A method comprising:
receiving, at a resource manager for a system of configurable computing resources, a request to allocate the configurable computing resources to a logical server to implement or execute a workload;
generating a first weighted sum allocation score for a first portion of the configurable computing resources available for allocation to the logical server;
generating a second weighted sum allocation score for a second portion of the configurable computing resources available for allocation to the logical server, the first and second portions of configurable computing resources including respective first and second configurations each having a plurality of disaggregate physical elements belonging to one or more types, the one or more types including a central processing unit type, a memory type, a storage type or a network input/output type, respective first and second weighted sum allocation scores generated using respective normalized performance values, where the normalized performance values correspond to at least two different respective types of allocation attributes selected from types of an operating temperature, a power/energy consumption, a total uptime in hours or a unit cost, for individual disaggregate physical elements included in the respective first and second configurations, the respective performance values separately multiplied by a plurality of separate weighting factors for the different respective types of allocation attributes for the individual disaggregate physical elements and then summed to generate the respective first and second sum allocation scores;
comparing the first and second weighted sum allocation scores to rank the first portion relative to the second portion; and
allocating the first portion or the second portion to the logical server based on the rank.

13. The method of claim 12, comprising:
the first weighted sum allocation score is $s_1$ and $$s_1 = m_t\left(\frac{t_1}{t_{max}}\right) + m_p\left(\frac{e_1}{e_{max}}\right) + m_u\left(\frac{u_1}{u_{max}}\right) + m_c\left(\frac{c_1}{c_{max}}\right),$$

where "$t_1$" represents the operating temperature allocation attribute for the first portion, "$t_{max}$" represents a maximum value for operating temperature for the first portion, "$e_1$" represents the power/energy consumption allocation attribute for the first portion, "$e_{max}$" represents a maximum value for power/energy consumption for the first portion, "$u_1$" represents the total uptime in hours allocation attribute for the first portion, "$u_{max}$" represents a maximum value for total uptime for the first portion, "$c_1$" represents the unit cost allocation attribute for the first portion, "$c_{max}$" represents a maximum value for unit cost for the first portion, and "$m_t$, $m_p$, $m_u$, $m_c$" for $s_1$ represent individual weighting factors for different respective types of allocation attributes for the first portion; and the second weighted sum allocation score is $s_2$ and $$s_2 = m_t\left(\frac{t_2}{t_{max}}\right) + m_p\left(\frac{e_2}{e_{max}}\right) + m_u\left(\frac{u_2}{u_{max}}\right) + m_c\left(\frac{c_2}{c_{max}}\right),$$

where "$t_2$" represents the operating temperature allocation attribute for the second portion, "$t_{max}$" represents a maximum value for operating temperature for the second portion, "$e_2$" represents the power/energy consumption allocation attribute for the second portion, $e_{max}$" represents a maximum value for power/energy consumption for the second portion "$u_2$" represents the total uptime in hours allocation attribute for the second portion, "$u_{max}$" represents a maximum value for total uptime for the second portion, "$c_2$" represents the unit cost allocation attribute for the second portion, $c_{max}$ represents a maximum value for unit cost for the second portion, and "$m_t$, $m_p$, $m_u$, $m_c$" for $s_2$ represent individual weighting factors for different respective types of allocation attributes for the second portion.

14. The method of claim 12, comprising:
allocating the first portion of the configurable computing resources to the logical server to implement or execute the workload;
monitoring a plurality of operating attributes for each configurable computing resource included in the first portion as the logical server implements or executes the workload;
generating a first weighted sum operating score for the first portion based on the plurality of monitored operating attributes;
ranking the first weighted sum operating score compared to one or more historical weighted sum operating scores determined for one or more other portions of the configurable computing resources previously allocated to implement or execute the workload; and
modifying what configurable computing resources are included in the first portion based on the ranking.

15. The method of claim 14, the first weighted sum operating score weighted based on a service level agreement for the workload.

16. The method of claim 14, the first weighted sum operating score is $S_1(W_j)$ and $$S_1(W_j) = U_1(W_j)M_1 + P_1(W_j)M_2 + \frac{M_3}{C_1(W_j)} + \frac{M_4}{E_1(W_j)},$$

where "j" represents the workload implemented or executed by the logical server, "$U_1(W_j)$" represents a utilization operating attribute for resources included in the first configuration while the logical server implements or executes the workload, "$P_1(W_j)$" represents a performance operating attribute of the first configuration while the logical server implements or executes the workload, "$C_1(W_j)$" represents a cost operating attribute for costs associated with the logical server implementing or executing the workload, "$E_1(W_j)$" represents an energy operating attribute for energy consumption while the logical server implements or executes the workload, and "$M_1$, $M_2$, $M_3$, $M_4$" represent separate multipliers to prioritize respective types of utilization, performance, cost and energy consumption operating attributes.

17. At least one non-transitory machine readable medium comprising a plurality of instructions that in response to being executed by circuitry located with a system of configurable computing resources cause the circuitry to:
receive a request to allocate the configurable computing resources to a logical server to implement or execute a workload;
generate a first weighted sum allocation score for a first portion of the configurable computing resources available for allocation to the logical server;
generate a second weighted sum allocation score for a second portion of the configurable computing resources available for allocation to the logical server, the first and second portions of configurable computing resources including respective first and second configurations each having a plurality of disaggregate physical elements belonging to one or more types, the one or more types including a central processing unit type, a memory type, a storage type or a network input/output type, respective first and second weighted sum allocation scores generated using respective normalized performance values, where the normalized performance values correspond to at least two different respective types of allocation attributes selected from types of an operating temperature, a power/energy consumption, a total uptime in hours or a unit cost, for individual disaggregate physical elements included in the respective first and second configurations, the respective performance values separately multiplied by a plurality of separate weighting factors for the different respective types of allocation attributes for the individual disaggregate physical elements and then summed to generate the respective first and second sum allocation scores;
compare the first and second weighted sum allocation score to rank the first portion relative to the second portion; and
allocate the first portion or the second portion to the logical server based on the rank.

18. The at least one non-transitory machine readable medium of claim 17, the system of configurable computing resources comprising the configurable computing resources maintained in a plurality of racks.

19. The at least one non-transitory machine readable medium of claim 18, the instructions to further cause the circuitry to:
allocate the first portion of the configurable computing resources to the logical server to implement or execute the workload;
monitor a plurality of operating attributes for each configurable computing resource included in the first portion as the logical server implements or executes the workload;
generate a first weighted sum operating score for the first portion based on the plurality of monitored operating attributes;
rank the first weighted sum operating score compared to one or more historical weighted sum operating scores determined for one or more other portions of the configurable computing resources previously allocated to implement or execute the workload; and modify what configurable computing resources are included in the first portion based on the ranking.

20. The at least one non-transitory machine readable medium of claim 19, the first weighted sum operating score is $S_1(W_j)$ and $$S_1(W_j) = U_1(W_j)M_1 + P_1(W_j)M_2 + \frac{M_3}{C_1(W_j)} + \frac{M_4}{E_1(W_j)},$$

where "j" represents the workload implemented or executed by the logical server, "$U_1(W_j)$" represents a utilization operating attribute for resources included in the first configuration while the logical server implements or executes the workload, "$P_1(W_j)$" represents a performance operating attribute of the first configuration while the logical server implements or executes the workload, "$C_1(W_j)$" represents a cost operating attribute for costs associated with the logical server implementing or executing the workload, "$E_1(W_j)$" represents an energy operating attribute for energy consumption while the logical server implements or executes the workload, and "$M_1$, $M_2$, $M_3$, $M_4$" represent separate multipliers to prioritize respective types of utilization, performance, cost and energy consumption operating attributes.

21. The at least one non-transitory machine readable medium of claim 17, comprising:

the first weighted sum allocation score is $s_1$ and $$s_1 = m_t\left(\frac{t_1}{t_{max}}\right) + m_p\left(\frac{e_1}{e_{max}}\right) + m_u\left(\frac{u_1}{u_{max}}\right) + m_c\left(\frac{c_1}{c_{max}}\right),$$

where "$t_1$" represents the operating temperature allocation attribute for the first portion, "$t_{max}$" represents a maximum value for operating temperature for the first portion, "$e_1$" represents the power/energy consumption allocation attribute for the first portion, $e_{max}$ represents a maximum value for power/energy consumption for the first portion, "$u_1$" represents the total uptime in hours allocation attribute for the first portion, $u_{max}$" represents a maximum value for total uptime for the first portion, "$c_1$" represents the unit cost allocation attribute for the first portion, $c_{max}$" represents a maximum value for unit cost for the first portion, and "$m_t$, $m_p$, $m_u$, $m_c$" for $s_1$ represent individual weighting factors for different respective types of allocation attributes for the first portion; and the second weighted sum allocation score is $s_2$ and $$s_2 = m_t\left(\frac{t_2}{t_{max}}\right) + m_p\left(\frac{e_2}{e_{max}}\right) + m_u\left(\frac{u_2}{u_{max}}\right) + m_c\left(\frac{c_2}{c_{max}}\right),$$

where "$t_2$" represents the operating temperature allocation attribute for the second portion, "$t_{max}$" represents a maximum value for operating temperature for the second portion, "$e_2$" represents the power/energy consumption allocation attribute for the second portion, $e_{max}$" represents a maximum value for power/energy consumption for the second portion, "$u_2$" represents the total uptime in hours allocation attribute for the second portion, $u_{max}$" represents a maximum value for total uptime for the second portion, "$c_2$" represents the unit cost allocation attribute for the second portion, $c_{max}$" represents a maximum value for unit cost for the second portion, and "$m_t$, $m_p$, $m_u$, $m_c$" for $s_2$ represent individual weighting factors for different respective types of allocation attributes for the second portion.

22. The at least one non-transitory machine readable medium of claim 21, the plurality of weighting factors for the different respective types of allocation attributes for the individual disaggregate physical elements are based on whether the request indicates that the configurable computing resources are to be allocated based on one of a cost sensitive template, a performance sensitive template, a high availability template or a balanced template.

23. The at least one non-transitory machine readable medium of claim 17, the plurality of weighting factors for the different respective types of allocation attributes, when added together or summed, have a value equal to 1.

24. An apparatus comprising:

means implemented by circuitry for receiving, at a resource manager for a system of configurable computing resources, a request to allocate the configurable computing resources to a logical server to implement or execute a workload;

means implemented by circuitry for generating a first weighted sum allocation score for a first portion of the configurable computing resources available for allocation to the logical server;

means implemented by circuitry for generating a second weighted sum allocation score for a second portion of the configurable computing resources available for allocation to the logical server, the first and second portions of configurable computing resources including respective first and second configurations each having a plurality of disaggregate physical elements belonging to one or more types, the one or more types including a central processing unit type, a memory type, a storage type or a network input/output type, respective first and second weighted sum allocation scores generated using respective normalized performance values, where the normalized performance values correspond to at least two different respective types of allocation attributes selected from types of an operating temperature, a power/energy consumption, a total uptime in hours or a unit cost, for individual disaggregate physical elements included in the respective first and second configurations, the respective performance values separately multiplied by a plurality of separate weighting factors for the different respective types of allocation attributes for the individual disaggregate physical elements and then summed to generate the respective first and second sum allocation scores;

means implemented by circuitry for comparing the first and second weighted sum allocation scores to rank the first portion relative to the second portion; and means implemented by circuitry for allocating the first portion or the second portion to the logical server based on the rank.

25. The apparatus of claim 24, comprising:

means implemented by circuitry for allocating the first portion of the configurable computing resources to the logical server to implement or execute the workload;

means implemented by circuitry for monitoring a plurality of operating attributes for each configurable computing resource included in the first portion as the logical server implements or executes the workload;

means implemented by circuitry for generating a first weighted sum operating score for the first portion based on the plurality of monitored operating attributes;

means implemented by circuitry for ranking the first weighted sum operating score compared to one or more historical weighted sum operating scores determined for one or more other portions of the configurable computing resources previously allocated to implement or execute the workload; and means implemented by circuitry for modifying what configurable computing resources are included in the first portion based on the ranking.

26. The apparatus of claim 24, the first weighted sum operating score is $S_1(W_j)$ and $$S_1(W_j) = U_1(W_j)M_1 + P_1(W_j)M_2 + \frac{M_3}{C_1(W_j)} + \frac{M_4}{E_1(W_j)},$$

where "j" represents the workload implemented or executed by the logical server, "$U_1(W_j)$" represents a utilization operating attribute for resources included in the first configuration while the logical server implements or executes the workload, "$P_1(W_j)$" represents a performance operating attribute of the first configuration while the logical server implements or executes the workload, "$C_1(W_j)$" represents a cost operating attribute for costs associated with the logical server implementing or executing the workload, "$E_1(W_j)$" represents an energy operating attribute for energy consumption while the logical server implements or executes the workload, and "$M_1, M_2, M_3, M_4$" represent separate multipliers to prioritize respective types of utilization, performance, cost and energy consumption operating attributes.

* * * * *